No. 758,358. PATENTED APR. 26, 1904.
J. GROENNING.
HORSESHOE.
APPLICATION FILED JULY 27, 1903.
NO MODEL.
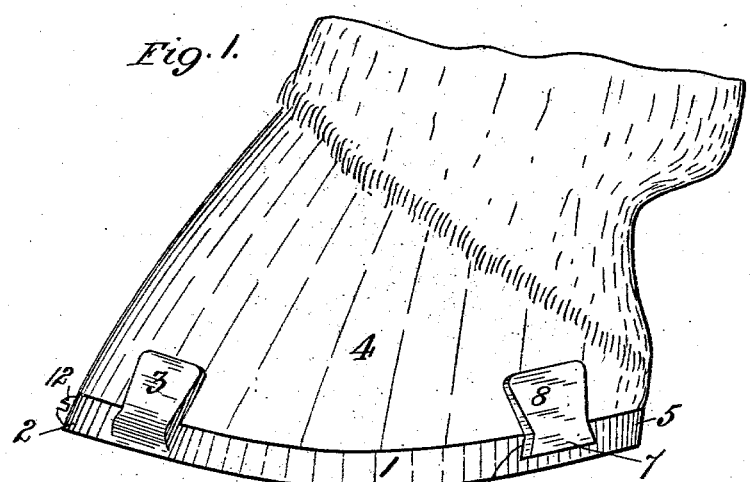
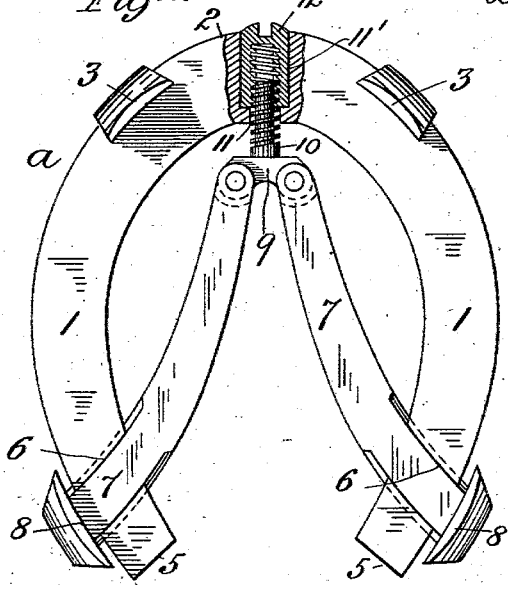
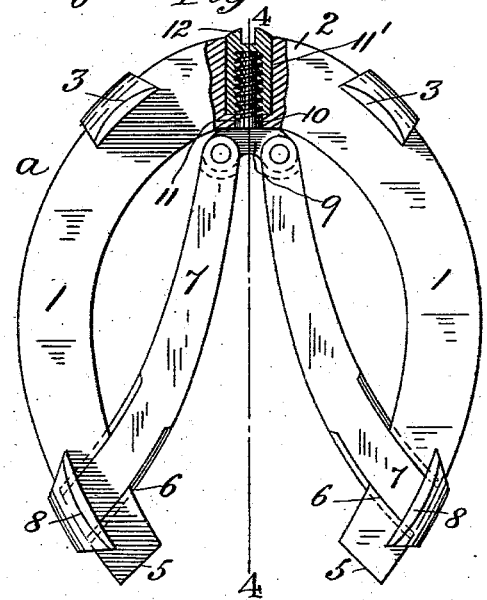
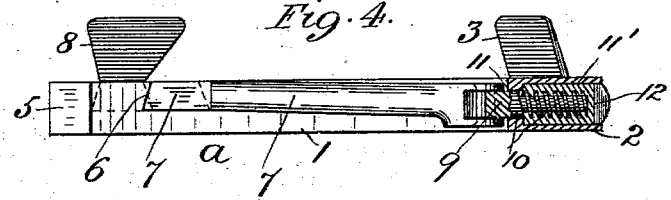
WITNESSES
W. A. Mullen.
Willard C. Killeen
INVENTOR
John Groenning
By Edward W. Furrell
His Atty No. 758,358. Patented April 26, 1904.

UNITED STATES PATENT OFFICE.

JOHN GROENNING, OF IRON RIVER, WISCONSIN.

HORSESHOE.

SPECIFICATION forming part of Letters Patent No. 758,358, dated April 26, 1904.

Application filed July 27, 1903. Serial No. 167,160. (No model.)

*To all whom it may concern:*

Be it known that I, JOHN GROENNING, a citizen of the United States, residing at Iron River, in the county of Bayfield and State of Wisconsin, have invented a new and useful Improvement in Horseshoes, of which the following is a specification.

My invention relates to a horseshoe, and has for its object to enable a shoe to be secured to the hoof of a horse without the use of nails.

The invention consists in features of novelty as hereinafter described and claimed, reference being had to the accompanying drawings, forming part of this specification, whereon—

Figure 1 is a perspective view of a horse's hoof with my improved horseshoe applied thereto; Fig. 2, a top plan of the shoe detached from the hoof, with its parts in the "unfastened" position; Fig. 3, a similar view to Fig. 2 of the shoe with its parts in the "fastened" position when applied to the hoof, (not shown;) and Fig. 4, a longitudinal vertical section through the shoe on line 4 4 in Fig. 3.

Like letters and numerals of reference denote like parts in all the figures.

$a$ represents a horseshoe having the usual curved sides 1 and front or toe portion 2. On the upper face of each side 1, adjacent to the front portion 2, is an upwardly-projecting lug or ear 3, which when the shoe $a$ is applied to the hoof 4 bears against the inclined surface of the hoof 4 thereat, as hereinafter more particularly referred to. The lugs 3 are preferably made integral with the shoe $a$, as shown, or may be of separate construction and affixed to the shoe $a$ in any suitable manner.

In the upper face of and entirely across each side 1, adjacent to its rear end or heel 5, is formed a preferably dovetailed groove 6 of suitable width and depth, which is curved or inclined from the outer edge of the side 1 toward the inner edge of the front portion 2. In each groove 6 is fitted and adapted to slide a bar 7, having at its outer end, adjacent to the outer edge of the side 1, an upwardly-projecting lug or ear 8, the inner ends of the bars 7, which extend along the space between the sides 1 within the plane of the shoe $a$ toward its front portion 2, being hinged to a cross-bar 9, which is located between the sides 1 opposite to the inner edge of the front portion 2.

From the cross-bar 9 projects a circular screw-threaded shank 10, which passes through a hole 11, formed for a suitable distance from the inner edge of the front portion 2 through the metal thereat, the said metal between the inner end of the hole 11 and the outer edge of the front portion 2 being bored out and forming a circular recess 11' concentric with the hole 11.

Within the recess 11' and around the screw-threaded shank 10 is fitted a circular nut 12, having its outer end adapted to be rotated by a screw-driver or other tool.

It is to be here noted that the bars 7 and cross-bar 9 are preferably shaped and operate at all times within the plane of the shoe $a$ between its upper and lower faces, thereby obviating any projections above or below the shoe $a$; also, that the bars 7 are so shaped as to partly surround and protect the base of the frog from injury.

In operation the shoe $a$, with its parts unfastened, as seen in Fig. 2, being applied to the hoof 4 with the front lugs 3 bearing against the corresponding parts of the hoof 4, the nut 12 is rotated on the screw-threaded shank 10 until its inner end butts against the inner end of the recess 11', in which position the outer end of the nut 12 is flush or thereabout with the outer edge of the shoe $a$, and by continuing to turn the nut 12 the shank 10, with its cross-bar 9 and bars 7, will be drawn toward the inner edge of the front portion 2 and in so doing the lugs 8 at the outer ends of the sliding bars 7 are drawn inward toward each other and close upon the corresponding rear portions of the hoof 4, thereby firmly holding the shoe $a$ to the hoof 4. By turning the nut 12 in the opposite direction the shank 10, cross-bar 9, and bars 7 are slackened and the lugs 8 thereby receded from the hoof 4 for removing the shoe $a$ therefrom.

By my invention the use of nails and consequent danger of crippling the horse are avoided.

What I claim as my invention, and desire to secure by Letters Patent, is—

A horseshoe having two opposite upwardly-projecting front stationary lugs, a bar adapted to slide diagonally through the heel portion of each side and in the plane of the shoe between the said sides, a lug projecting upward from the bar at its outer end, the said bars being opposite to each other and hinged at their inner ends to a cross-bar, a hole formed part way through and in the plane of the front portion of the shoe from its inner edge, a screw-threaded shank projecting from the cross-bar and adapted to slide through the said hole, a circular recess concentric with the said hole and opening from the shoe at its front edge, and a nut adapted to be rotated on the said shank within the recess, and to engage the inner end of the recess, substantially as described.

In testimony whereof I have signed my name to this specification in the presence of two subscribing witnesses.

JOHN GROENNING.

Witnesses:
ALFRED SVENDSEN,
ALEXANDER HOLAND.